United States Patent [19]

Heller

[11] 4,350,577
[45] Sep. 21, 1982

[54] ELECTRONICALLY INDUCED MULTIPHOTON ABSORPTION

[75] Inventor: Donald F. Heller, Morris Plains, N.J.

[73] Assignee: Allied Corporation, Morris Township, Morris County, N.J.

[21] Appl. No.: 93,659

[22] Filed: Nov. 13, 1979

[51] Int. Cl.³ .............................................. B01D 59/00
[52] U.S. Cl. .......................... 204/157.1 R; 204/158 R; 423/3
[58] Field of Search .................... 204/157.1 R, 158 R, 204/DIG. 11; 423/3

[56] References Cited

U.S. PATENT DOCUMENTS 4,233,125  11/1980  Schafer ........................ 204/157.1 R

OTHER PUBLICATIONS

Moore, C. B. "The Application of Lasers to Isotope Separation", *Accts. Chem. Res.* 6:323-8, 1973.
Ambartzumion, R. V. et al., "Selective Two-Step (STS) Photoionization of Atoms and Photodissociation of Molecules by Laser Radiation", *App. Opt.*, 11 (2): 354–358, Feb. 1972.
Ronn, A. M., "Laser Chemistry", *Sci. Am.* May 1979, pp. 114-128.
Zare, R. N., "Laser Separation of Isotopes", *Sci. Am.* 236:86-98, Feb. 1977.

*Primary Examiner*—Deborah L. Kyle
*Attorney, Agent, or Firm*—James Riesenfeld; Gerhard H. Fuchs

[57] ABSTRACT

Electronic excitation of polyatomic molecules followed by nonradiative decay provides states from which efficient multiphoton infrared excitation can be achieved. Initial (electronic) excitation can be molecule-specific or isotope-selective. Subsequent multiphoton excitation has a threshold which can be an order of magnitude or more lower than for multiphoton excitation from the ground state. By this method, laser-induced chemical reactions or isotope separation can be achieved with lower infrared laser fluence and/or higher concentration of polyatomic molecules than with prior art methods.

17 Claims, 5 Drawing Figures

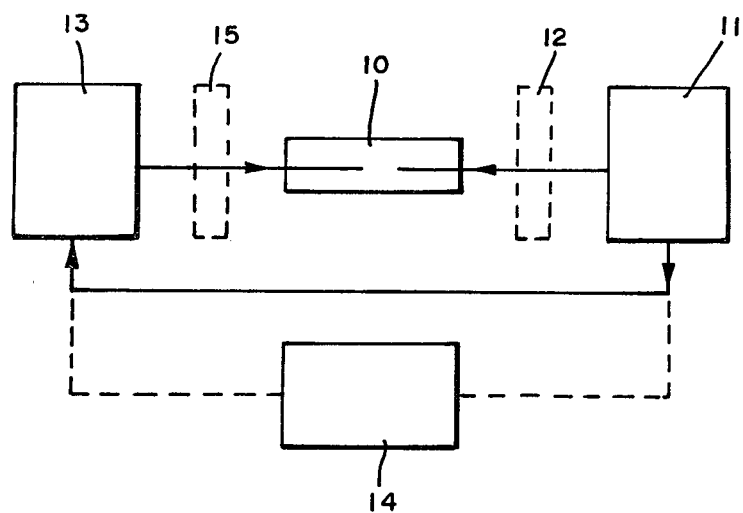
F I G. 5

ELECTRONICALLY INDUCED MULTIPHOTON ABSORPTION

DESCRIPTION

BACKGROUND OF THE INVENTION

1. Field of the Invention

This invention relates to multiphoton absorption of infrared radiation and, more particularly, to enhancing multiphoton absorption of infrared radiation by electronic excitation of polyatomic molecules.

2. Description of the Prior Art

Among the advances in photochemistry made possible by the laser is "multiphoton absorption," which refers to the absorption by a polyatomic molecule of a large number of photons—generally infrared—of the same energy. In absorbing the photons, the molecule is excited up the ladder of vibrational levels to a highly excited vibrational state. Since the energy separations between adjacent vibrational levels are not equal, a series of photons of different energies corresponding to the successive level separations would appear to be necessary. However, in intense IR laser fields, a very large number of IR photons all having the same energy may be absorbed by a polyatomic molecule, leading to collisionless photodissociation or predissociation or to other chemical reactions.

Multiphoton infrared laser excitation has been discussed extensively in the scientific literature (see, e.g., A. S. Sudbo, P. A. Schulz, Y. R. Shen and Y. T. Lee, J. Chem. Phys. 69, 2312 (1978) and R. V. Ambartzumian and V. S. Letokhov in *Chemical and Biochemical Applications of Lasers*, Vol. III, edited by C. B. Moore (Academic Press, New York, 1977)) and has been used as an isotope separation method (see, e.g., U.S. Pat. No. 4,049,515, issued Sept. 20, 1977 to Robinson et al. and U.S. Pat. No. 3,937,956, issued Feb. 10, 1976 to Lyon).

A disadvantage of prior art multiphoton excitation is the high fluence (product of intensity and time) required for excitation. This high fluence threshold, generally greater than about 10 J/cm$^2$, requires the use of costly, high-power infrared lasers. High fluence requirements also limit operating pressure, since for fluence of ~50 J/cm$^2$, dielectric breakdown will generally occur, unless pressure is $\lesssim 1$ kPa. Low operating pressure implies low production rate.

Karny et al., Chem. Phys., 37, 15 (1979), have reported multiphoton absorption and corresponding induced electronic emission from chromium oxychloride ($CrO_2Cl_2$) following excitation by a focused 1 J $CO_2$ laser tuned to R(30) at 10.2 $\mu$m. Since prior art multiphoton absorption requires that excitation be very close to resonance, they found no evidence of absorption when irradiation was in the adjacent P branch at 10.6 $\mu$m or in the 9.6 $\mu$m band.

SUMMARY OF THE INVENTION

As used in this specification and the appended claims, the term "chemical reaction" is meant to include unimolecular reactions, such as isomerization, dissociation and predissociation, in addition to more conventional chemical reactions.

In accordance with the present invention, a multiphoton excitation method is provided, which comprises the sequential steps of:

(a) exposing a material comprising polyatomic molecules to electromagnetic radiation of a predetermined wavelength in the range from visible to ultraviolet whereby the polyatomic molecules are excited to an excited electronic state having a nonradiative lifetime for decay to an excited vibrational state of a lower electronic state and (b) exposing the material to infrared laser radiation, whereby the excited molecules are excited by multiphoton absorption to higher vibrational states to produce a state at which the excited molecules undergo a chemical reaction.

Optimum results are achieved when the time delay between exposure to visible/ultraviolet radiation and exposure to infrared laser radiation is equal to or longer than the nonradiative lifetime of the excited electronic state. Thus, if the infrared radiation follows nonradiative decay of the excited molecule to an excited vibrational state of a lower electronic state, then efficient resonant absorption of infrared photons occurs even when the fluence is considerably less than 10 J/cm$^2$. This electronically induced reduction in threshold fluence for multiphoton absorption permits the use of lower-power infrared lasers and facilitates electronic or chemical changes which would be otherwise more difficult or impossible.

In a preferred embodiment of the present invention, isotope enrichment and separation is effected by the sequential steps of:

(a) exposing a material of polyatomic molecules comprising a particular isotope of an element and at least one other isotope of the same element to electromagnetic radiation of a predetermined wavelength in the range from visible to ultraviolet to preferentially excite the polyatomic molecules containing the particular isotope of the element to an excited electronic state having a nonradiative lifetime for decay to an excited vibrational state of a lower electronic state;

(b) exposing the material to infrared laser radiation, whereby the excited molecules, enriched in the particular isotope, are excited by multiphoton absorption to higher vibrational states to produce a state at which the excited molecules undergo a chemical reaction and (c) separating the resultant reaction product, enriched in the particular isotope, from the remainder of the material. Separation may be effected by conventional chemical or physical means; for example, by cryogenic separation.

BRIEF DESCRIPTION OF THE DRAWINGS

FIG. 5 is a schematic illustration of apparatus suitable for practicing this invention.

DETAILED DESCRIPTION OF THE INVENTION

Figure 1:
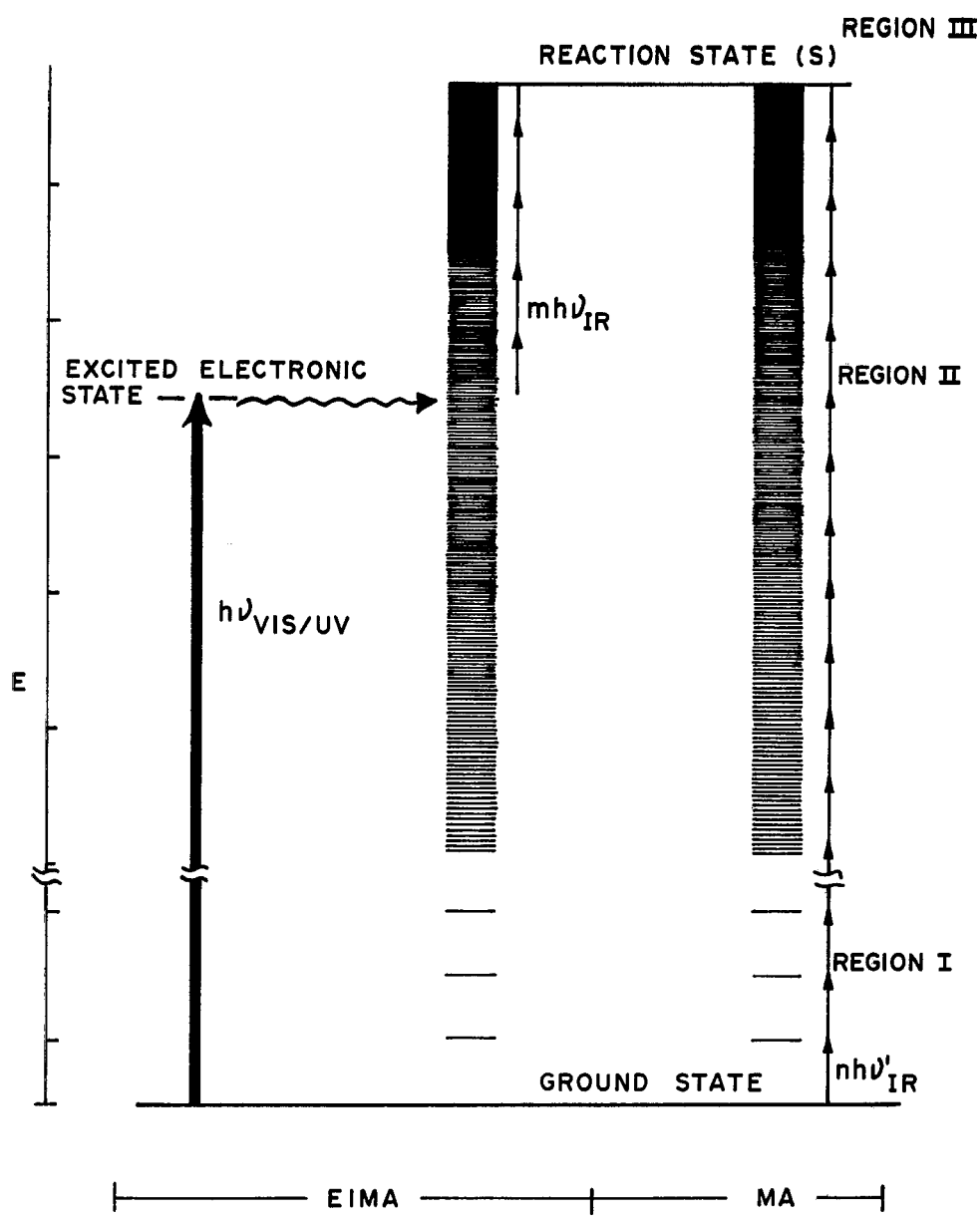
FIG. 1 shows a schematic energy level diagram which contrasts the prior art multiphoton absorption (MA) with the electronically induced multiphoton absorption (EIMA) of the present invention.

Conventional multiphoton absorption (MA) can be understood by referring to FIG. 1. Initially (in Region I) photon absorption proceeds by inducing transitions between discrete molecular vibrational levels. AC Stark broadening compensates for anharmonic effects which tend to push higher transitions out of resonance with the applied field. Operationally, the applied field must be nearly resonant with an infrared-active fundamental vibrational transition. Above some threshold energy, which depends on the absorbing molecule, the photons can excite a quasicontinuum of molecular states (in Region II). The remainder of the up-pumping process proceeds efficiently (as if everywhere on resonance) and is relatively independent of photon energy. Up-pumping continues until a true continuum (Region III), or at least a denser quasicontinuum, is reached and electronic or chemical change competes effectively with the absorption process.

Region I is where all frequency-specific effects take place, including molecule-specific and isotope-selective excitation. Here excitation requires resonant (or nearly resonant) fields and presents a laser fluence threshold for the overall up-pumping process.

Many polyatomic molecules undergo efficient intramolecular nonradiative relaxation from low-lying (e.g., optically accessible) electronic states. This radiationless decay produces molecules in the vibrationally excited quasicontinuum of a lower electronic state. These molecules have in a sense gained direct access to Region II. Thus, at some later time an off-resonance (with respect to any fundamental vibrational transition) infrared pulse can produce further (multiphoton) excitation and concomitant molecular processes.

In the method of the present invention, initial (state specific) electronic excitation and subsequent radiationless relaxation provide a mechanism for circumventing Region I while maintaining species- and isotope-selectivity. After radiationless relaxation to the vibrationally excited quasicontinuum of the lower electronic state, infrared multiphoton excitation of the present invention competes with unwanted collisional deexcitation. The latter depends on the product of collision probability and time in the excited vibrational state. Thus, multiphoton absorption is favored by low pressure and minimum delay before infrared excitation. Optimum delay time between exposure to visible/ultraviolet radiation and exposure to infrared laser radiation is the nonradiative lifetime of the excited electronic state or as short an additional delay beyond the nonradiative lifetime as possible. If the infrared excitation reduces the lifetime of the excited electronic state, then delays as short as the reduced lifetime are preferred.

The method of this invention leads to striking efficiency enhancements of off-resonance multiphoton absorption, with thresholds for multiphoton absorption reduced by an order of magnitude or even more. Multiphoton excitation excites polyatomic molecules to a state at which the excited molecules undergo a chemical reaction. Thereafter, if desired, the resultant reaction product may be separated from the remainder of the material by conventional chemical or physical means.

In general, electronically induced multiphoton absorption is a suitable excitation method for polyatomic molecules having optically accessible excited electronic states which have at least one bound vibrational state and a corresponding (isoenergetic) excited vibrational state in a lower electronic state.

Among the materials comprising polyatomic molecules which are suitable for practicing this invention are transition metal complexes, particularly metal carbonyls, which yield organometallic compounds as reaction products. Nickel carbonyl and iron tetracarbonyl dihydride exemplify suitable metal carbonyls. Other suitable materials for practicing the invention are chromium oxychloride, formaldehyde and uranium hexafluoride, particularly chromium oxychloride.

The present invention requires use of two different electromagnetic wavelengths, one visible to ultraviolet and the other infrared. The source of visible/ultraviolet radiation may be a laser (pulsed or continuous wave) or a high intensity lamp. A laser source is preferably a frequency doubled or tripled Nd:YAG laser (532 nm or 355 nm, respectively) or a tunable dye laser. The source of infrared radiation is a laser, preferably a $CO_2$ laser. When $UF_6$ is the material used, a $CF_4$ laser, a relatively weak 16 $\mu$m source, is also a suitable infrared source.

Figure 2:
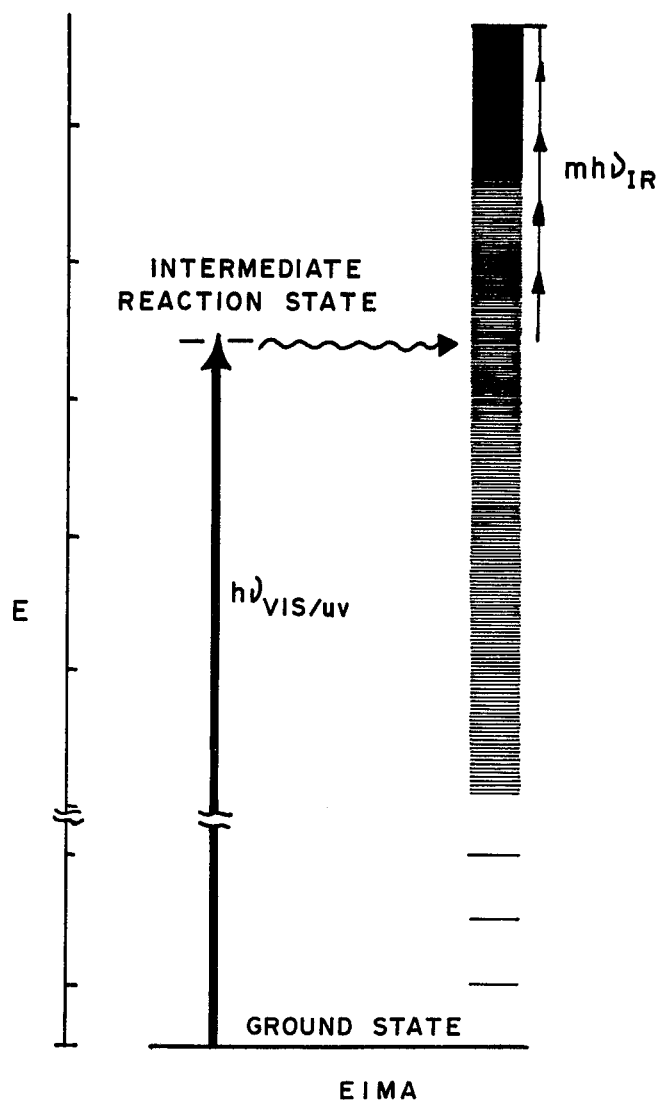
FIG. 2 shows a schematic energy level diagram for an embodiment of the present invention that involves an intermediate reaction prior to multiphoton absorption.

FIG. 2 is a schematic energy level diagram which shows an embodiment of the present invention that involves an intermediate reaction product. The visible/ultraviolet irradition excites the polyatomic molecules to an intermediate reaction state at which the molecules undergo a chemical reaction to yield an intermediate reaction product in an excited vibrational state. Thereafter, the reaction product is excited by multiphoton infrared excitation.

Figure 3:
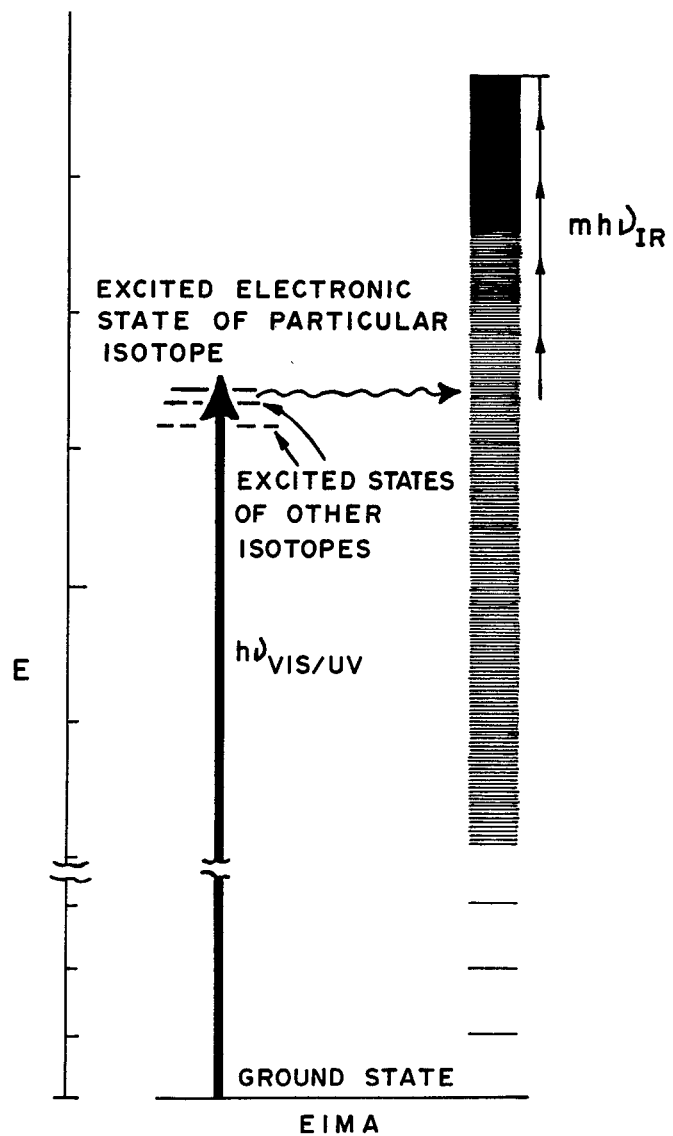
FIG. 3 shows a schematic energy level diagram for isotope separation by one embodiment of the present invention.

FIG. 3 is a schematic energy level diagram which shows an isotope enrichment and separation method of the present invention. In this method a visible to ultraviolet wavelength must be selected which excites molecules containing a particular isotope of an element to an excited electronic state but does not substantially excite molecules containing other isotopes of that element. The method is suitable for separating isotopes in materials such as formaldehyde, chromium oxychloride and uranium hexafluoride, particularly formaldehyde. As with other embodiments of the invention, the source of visible/ultraviolet radiation may be a laser or a high intensity lamp. Frequency doubled or tripled Nd:YAG lasers and tunable dye lasers are preferred. The source of infrared radiation is a laser, preferably a $CO_2$ laser. When $UF_6$ is the material used, a $CF_4$ laser is also suitable.

As discussed above, the time delay between exposure to visible/ultraviolet radiation and exposure to infrared laser radiation may be equal to or minimally longer than the nonradiative lifetime of the excited electronic state. Alternatively, the time delay between exposures may be shorter than the nonradiative lifetime of the excited electronic state and nevertheless yield enhanced multiphoton infrared absorption (for example, when $D_2CO$ is the material being used).

Figure 4:
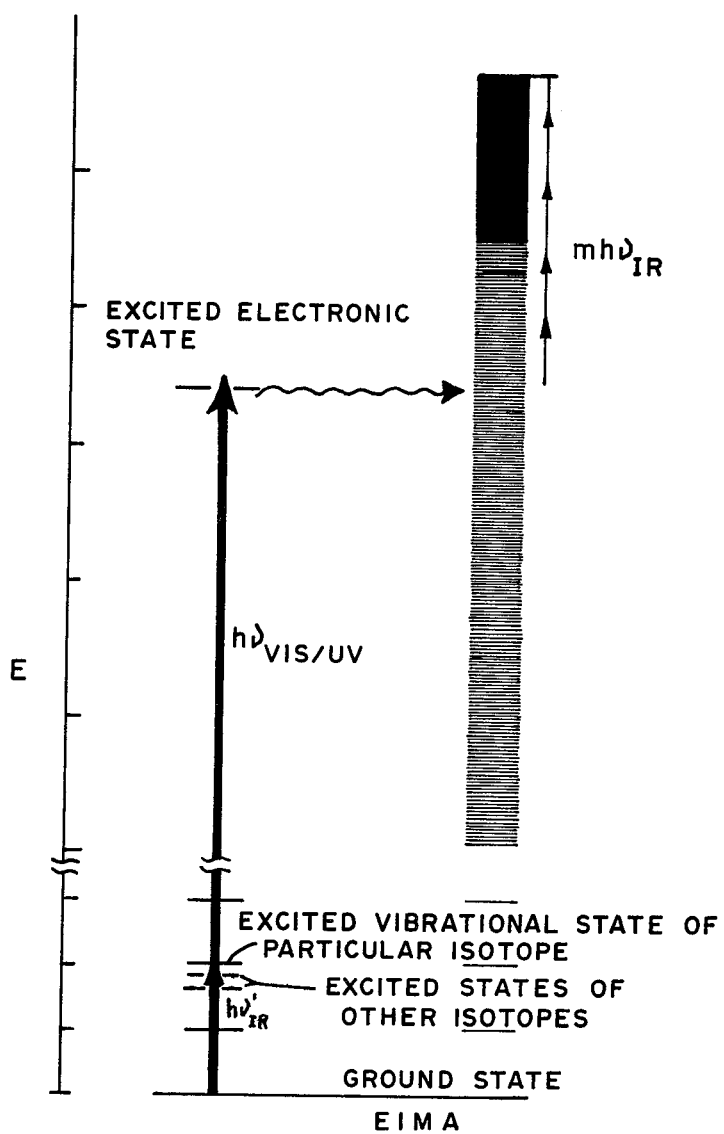
FIG. 4 shows a schematic energy level diagram for isotope separation by another embodiment of the present invention.

FIG. 4 is a schematic energy level diagram which shows isotope enrichment and separation by another embodiment of the present invention. This method involves first exciting a material of polyatomic molecules isotope-selectively with infrared radiation. The excited molecules, which contain the particular isotope, are then electronically excited by visible/ultraviolet irradiation. After a delay during which these molecules decay to an excited vibrational state of a lower electronic state, the molecules are excited by multiphoton infrared excitation and undergo a chemical reaction. The reaction product, enriched in the particular isotope, is then separated from the remainder of the material by conventional chemical or physical means.

FIG. 5 is a schematic of an apparatus suitable for the practice of the present invention. The material to be exposed is contained in a cell 10. Visible/ultraviolet light is emitted by source 11, passes through (optional) optical system 12 and irradiates material in cell 10. Source 11 also provides a synchronized output signal that triggers infrared laser 13. Optionally, the signal is subjected to a variable time delay by pulse delay generator 14. The infrared radiation from laser 13 passes through (optional) optical system 15 and irradiates the material in cell 10.

In general, temperature is not critical in the practice of this invention, and operation at ambient temperature is thus suitable as well as convenient. However, for isotope separation sub-ambient temperature operation (e.g. by expanding a gaseous material through a nozzle) may be required in order to discriminate between the isotopic species in the initial photoexcitation. In those cases, the temperature is preferably reduced until the features of the visible/ultraviolet absorption spectra of the isotopes to be separated are distinguishable. Alternatively, when the initial (isotope-selective) excitation is within the ground state (as shown in FIG. 4) then it is the infrared absorption spectra of the isotopes which must be distinguishable.

Suitable pressures at which this invention may be practiced depend on the fluence. In general, the methods of this invention are practiced at pressures below atmospheric pressure, preferably at pressures below about 1 kPa. However, higher pressure operation is feasible at somewhat higher fluence. The minimum fluence required is determined by the pressure-dependent collisional quenching of multiphoton absorption. The maximum fluence is limited by dielectric breakdown.

EXAMPLE 1

Commercially available $CrO_2Cl_2$ was degassed, distilled under high vacuum and admitted to a monel sample cell fitted with NaCl windows sealed by indium o-rings. The $CrO_2Cl_2$ was irradiated with the outputs from a frequency doubled Nd:YAG laser at 532 nm and a $CO_2$ TEA laser. The delay between the laser pulses was adjusted over a range from 0 to a few hundred microseconds using a digital pulse delay generator. The doubled Nd:YAG laser radiation was unfocused and had a beam diameter of 1 cm. The $CO_2$ laser radiation was focused with an 18.4 cm focal length NaCl lens, and the emission was viewed over a 2 cm region centered at the focus or displaced 1.5 cm from the focus. The Nd:YAG and $CO_2$ pulse widths (FWHM) were 8 ns and 40 ns, respectively. The absorption of off-resonance IR excitation was increased $\gtrsim 100$ x when it followed within ~10 μsec of the Nd:YAG pulse. Intensity of luminescent emission from electronically excited product correlated with the absorption. The following is the process:

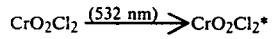

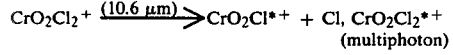

*electronically excited molecule
+ vibrationally excited molecule

No detectable emission was observed from unfocused 532 nm excitation alone. Multiphoton-induced luminescence signals were observed off-resonance (with 10.6 μm P branch excitation), which became comparable to the on-resonance (10.2 μm excitation) signal when a preceding Nd:YAG pulse saturated the excitation volume. The wavelength dependence of the IR fluence threshold for luminescence also showed this type of behavior. The results illustrate that the method of this invention substantially lowers the multiphoton threshold for off-resonance excitation.

EXAMPLE 2

Uranium hexafluoride ($UF_6$) vapor, a tripled Nd:YAG laser (355 nm) and a $CO_2$ laser (10.6 μm) or a $CF_4$ laser (16 μm) are employed, with the apparatus and procedure otherwise the same as for Example 1. The following process occurs:

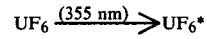

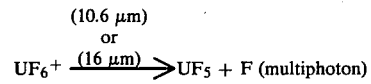

The fluence threshold for the $CO_2$ or $CF_4$ laser multiphoton absorption is substantially lower than it is when the $UF_6$ is not first electronically excited.

EXAMPLE 3

Formaldehyde ($H_2CO$) vapor and a tripled Nd:YAG laser are employed, with the apparatus and procedure otherwise the same as for Example 1. The following process occurs:

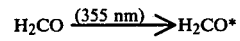

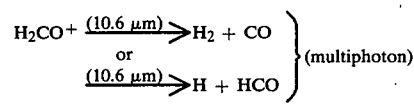

Multiphoton dissociation of $H_2CO$ by $CO_2$ laser excitation has not been accomplished by the methods of the prior art.

EXAMPLE 4

Deuterium isotope separation is accomplished by simultaneously irradiating $H_2CO$ vapor that includes the natural abundance (~$2 \times 10^{-6}$%) of $D_2CO$ with the output from a tunable dye laser, BPBD dye pumped with a frequency doubled Nd:YAG laser, and a $CO_2$ laser. The following process occurs:

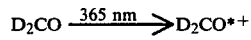

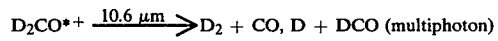

The deuterium is separated by condensing the other materials with liquid nitrogen.

I claim:

1. A multiphoton excitation method comprising the sequential steps of:
   (a) exposing a material comprising polyatomic molecules to electromagnetic radiation of a predetermined wavelength in the range from visible to ultraviolet whereby the polyatomic molecules are excited to an excited electronic state having a nonradiative lifetime for decay to an excited vibrational state of a lower electronic state and
   (b) exposing the material to infrared laser radiation, whereby the excited molecules that have decayed to the excited vibrational state of the lower electronic state are excited by multiphoton absorption to higher vibrational states to produce a state at which the excited molecules undergo a chemical reaction.

2. The method of claim 1 wherein a time delay between exposures is equal to or longer than the nonradiative lifetime of the excited electronic state.

3. The method of claim 1 wherein the material comprises chromium oxychloride.

4. The method of claim 1 wherein the source of the visible to ultraviolet radiation is a laser.

5. The method of claim 4 wherein the laser is a frequency doubled or tripled Nd:YAG laser.

6. The method of claim 4 wherein the laser is a tunable dye laser.

7. The method of claim 1 wherein the source of the visible to ultraviolet radiation is a high intensity lamp.

8. The method of claim 1 wherein the source of the infrared laser radiation is a $CO_2$ laser.

9. The method of claim 1 further comprising the step of separating the resultant reaction product from the remainder of the material.

10. An isotope enrichment and separation method comprising the sequential steps of:
    (a) exposing a material of polyatomic molecules comprising a particular isotope of an element and at least one other isotope of the same element to electromagnetic radiation of a predetermined wavelength in the range from visible to ultraviolet to preferentially excite the polyatomic molecules containing the particular isotope of the element to an excited electronic state having a nonradiative lifetime for decay to an excited vibrational state of a lower electronic state;
    (b) exposing the material to infrared laser radiation, whereby the excited molecules that have decayed to the excited vibrational state of the lower electronic state and that are enriched in the particular isotope, are excited by multiphoton absorption to higher vibrational states to produce a state at which the excited molecules undergo a chemical reaction and
    (c) separating the resultant reaction product, enriched in the particular isotope, from the remainder of the material.

11. The method of claim 10 wherein the material comprises formaldehyde.

12. The method of claim 10 wherein the source of the visible to ultraviolet radiation is a laser.

13. The method of claim 12 wherein the laser is a frequency doubled or tripled Nd:YAG laser.

14. The method of claim 12 wherein the source of the visible to ultraviolet radiation is a tunable dye laser.

15. The method of claim 10 wherein the source of the visible to ultraviolet radiation is a high intensity lamp.

16. The method of claim 10 wherein the source of the infrared laser radiation is a $CO_2$ laser.

17. The method of claim 10 further comprising before step (a):
    exposing the material to infrared radiation of a predetermined wavelength to preferentially excite polyatomic molecules containing the particular isotope of the element to an excited vibrational state of the ground electronic state.

* * * * *